Feb. 8, 1927.
T. J. CARTER
1,616,485
ARTIFICIAL FISH BAIT
Filed April 13, 1923
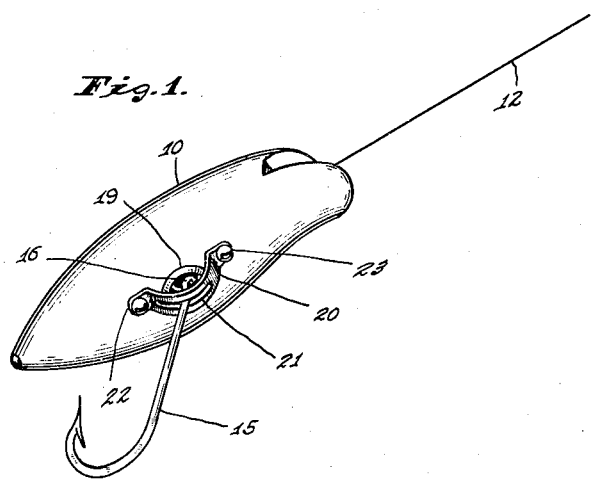
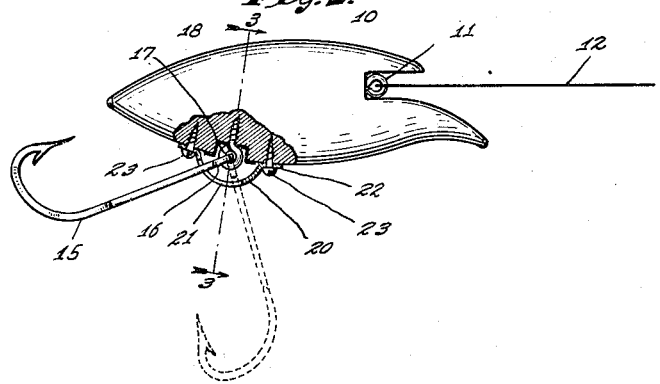
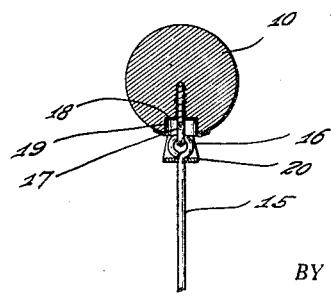
INVENTOR.
Thomas J. Carter,
BY
ATTORNEY.

Patented Feb. 8, 1927.

1,616,485

UNITED STATES PATENT OFFICE.

THOMAS J. CARTER, OF INDIANAPOLIS, INDIANA, ASSIGNOR TO CARTER BAIT COMPANY, OF INDIANAPOLIS, INDIANA, A CORPORATION OF INDIANA.

ARTIFICIAL FISH BAIT.

Application filed April 13, 1923. Serial No. 631,837.

It is the object of my invention to provide for a fish hook of an artificial bait a guiding mounting which permits all necessary relative movements between the fish hook and the body of the bait but limits such relative movements to those that are necessary and prevents undesirable movements between the fish hook and the bait-body. More especially, it is the object of my invention to permit the fish hook to swing in the longitudinal normally vertically plane of the bait body, but to prevent the hook from swinging out of such plane and from turning to positions which are either ineffective for catching fish or effective for catching weeds; and, in the preferred form, to limit the swing of the hook to a predetermined angle in such longitudinal normally vertical plane.

The accompanying drawing illustrates my invention: Fig. 1 is a perspective view of an artificial bait with a hook having a guiding mounting therein in accordance with my invention, the view being taken looking obliquely and laterally upward at the bait; Fig. 2 is a side elevation of the bait and hook and hook-mounting shown in Fig. 1, with the bait-body partly in section at the hook-mounting; and Fig. 3 is a transverse section substantially on the line 3—3 of Fig. 2.

The bait-body 10 is shown as of the type disclosed in my co-pending application, Serial No. 287,207, filed April 3, 1919, but this is merely by way of example, as the bait-body may be of any desired type and form. This bait-body 10, which is usually though not necessarily made of wood, is usually provided with an eye 11 by which it may be attached to the fish-line 12, in the usual manner of baits.

Hung from the body 10 there may be any desired number of fish hooks 15. I have shown only one hook 15, attached to the bait-body 10 at an intermediate point in the ventral medial longitudinal line thereof, as I prefer a bait with a single hook because it is more sportsmanlike; but my invention is applicable to a mounting of a hook in an artificial bait whether or not there is only a single hook.

The upper or attaching end of the hook is usually provided with an eye 16, which interloops through the eye of a screw-eye 17 screwed into the bottom of the bait-body 10 or otherwise suitably attached thereto. The eye of the screw-eye 17 is preferably set in a recess 18 in the under side of the bait-body, conveniently with a flanged sheet-metal cup-shaped liner 19 for such recess. This recess 18 is preferably of such depth that the center of the eye of the screw-eye is about flush with the under surface of the bait-body.

To guide the movements of the hook 15, I provide an arc-shaped guide 20, having a central longitudinal slot 21 through which the shank of the hook 15 passes. The guide 20 is preferably made of sheet-metal having out-turned ends 22 to provide attaching ears by which the guide may be attached to the bait-body by screws 23. The two screws 23, the screw-eye 17, and the slot 21 are preferably all substantially in the medial longitudinal normally vertical plane of the bait-body, and the guide 20 is so arranged that the eye of the screw-eye 17 is substantially at the center of the arc-shaped part of such guide.

I have shown the guide 20 as a separate member, made of sheet-metal, and attached to the bait-body 10. However, this is merely a convenient form, as it is not necessary that the guide be made of sheet-metal, or that it be separate from the bait-body. It is merely more convenient to make it that way.

In operation, the guide 20 limits the swing of the fish hook 15 to the plane of the slot 21; and the swing even in this plane is limited by the length of the slot, which is preferably arranged to stop the forward swinging movement of the hook at a point a little forward of the vertical, as indicated in dotted lines in Fig. 2, and to stop the backward swing of the hook a little short of the horizontal position with the hook straight back. Between these limiting positions, the fish hook is free to assume a position in which a rear-turned point will lie in substantial alinement with the bait-body. In normal position, the hook 15 is at an intermediate point in its swing, the exact position varying in accordance with the speed at which the bait is being pulled forward through the water. Thus the swinging of the hook is limited to a definite arc of about 90°, in the plane of the hook itself, and in the medial longitudinally normally vertical plane of the bait-body; and cannot swing laterally out of such plane.

Throughout its movement, the point of the hook is definitely held upward and behind the shank of the hook, so that it is in an effective position for catching any fish which strikes, and is definitely out of position to catch on any weeds or other obstructions in the water, or to snag on anything on the bottom in case the bait drags on the bottom in being manipulated. By means of the guard, the point of the hook is held in such position relative to the bait-body that it is always preceded through the water by the shank of the hook or the bait-body so that the point of the hook is guided around any obstructions on which it might otherwise catch. In other words, the hook is effectively weedless, without being rigid with the bait-body as weedless hooks usually are, so that by reason of the relative movability of bait-body and hook the fish has a sportier chance to free itself; but at the same time, the hook is also effective to snag any fish that strikes, and to do so whether the fish strikes from the back or the side. In striking, the fish may roll the bait-body, but the hook is held by the guide 20 in the definite medial longitudinal plane of the bait-body regardless of the rolling thereof, and in effective position to catch the striking fish.

I claim as my invention:—

1. In an artificial bait, the combination of a bait-body having a hook-supporting eye, a fish hook depending from said bait-body by having at its upper end an eye which interloops through said hook-supporting eye to provide a swinging movement for the fish hook through a wide angle, and a slotted sheet-metal guide co-operating with the shank of the fish hook throughout its swing to limit to a predetermined plane the swing of said fish hook with the relation to the bait-body but to permit such swing in that plane through a wide angle sufficient to let a rear-turned point of said fish hook swing up into and down out of alined position behind the bait-body.

2. In an artificial bait, the combination of a bait-body having a hook-supporting eye, a fish hook depending from said bait-body by having at its upper end an eye which interloops through said hook-supporting eye to provide a swinging movement for the fish hook through a wide angle, and a guide co-operating with the shank of the fish hook throughout its swing to limit to a predetermined plane the swing of said fish hook with relation to the bait-body but to permit such swing in that plane through a wide angle sufficient to let a rear-turned point of said fish hook swing up into and down out of alined position behind the bait-body.

3. In an artificial bait, the combination of a bait-body having a hook-supporting eye, a fish hook depending from said bait-body by having at its upper end an eye which interloops through said hook-supporting eye to provide a swinging movement for the fish hook through a wide angle, and a slotted sheet-metal guide co-operating with the shank of the fish hook throughout its swing to limit the swing of the fish hook with relation to the bait-body to the medial longitudinal normally vertical plane of the bait-body but to permit such swing in that plane through a wide angle sufficient to let a rear-turned point of said fish hook swing up and down into and out of alined position behind the bait-body.

4. In an artificial bait, the combination of a bait-body having a hook-supporting eye, a fish hook depending from said bait-body by having at its upper end an eye which interloops through said hook-supporting eye to provide a swinging movement for the fish hook through a wide angle, and a guide co-operating with the shank of the fish hook throughout its swing to limit the swing of the fish hook with relation to the bait-body to the medial longitudinal normally vertical plane of the bait-body but to permit such swing in that plane through a wide angle sufficient to let a rear-turned point of said fish hook swing up and down into and out of alined position behind the bait-body.

5. A guide for a fish hook in an artificial bait, comprising a slotted arc-shaped member provided with attaching eyes by which it may be attached to the bait-body on opposite sides of the hook support with the shank of the hook projecting at all times through the slot.

6. In an artificial bait, the combination of a bait-body, a fish hook swingingly mounted on said bait-body to hang from and swing freely in the plane of the hook through a wide angle, with such plane of the hook extending longitudinally of the bait-body, and guide means co-operating with the shank of the hook to limit the swinging of the hook to the plane of the hook and to a predetermined but wide angle in such plane and including a position with the shank of the hook substantially perpendicular to the bait-body.

7. In an artificial bait, the combination of a bait-body, a fish hook swingingly mounted on said bait-body to hang from and swing freely in the plane of the hook through a wide angle, with such plane of the hook extending longitudinally of the bait-body, and guide means co-operating with the shank of the hook to limit the swinging of the hook to the plane of the hook and including a position with the shank of the hook substantially perpendicular to the bait-body.

In witness whereof, I have hereunto set my hand at Indianapolis, Indiana, this 11th day of April, A. D. one thousand nine hundred and twenty-three.

THOMAS J. CARTER.